(12) United States Patent
Keefe

(10) Patent No.: US 6,421,929 B1
(45) Date of Patent: Jul. 23, 2002

(54) APPARATUS AND METHOD TO MEASURE TAPERED OR CONICAL PARTS

(75) Inventor: William R. Keefe, Orono, MN (US)

(73) Assignee: Command Tooling Systems, Ramsey, MN (US)

( * ) Notice: Subject to any disclaimer, the term of this patent is extended or adjusted under 35 U.S.C. 154(b) by 0 days.

(21) Appl. No.: 09/747,125

(22) Filed: Dec. 21, 2000

(51) Int. Cl.[7] .................................................. G01B 5/24
(52) U.S. Cl. .......................................... 33/549; 33/551
(58) Field of Search .......................... 33/534, 536, 537, 33/549, 550, 551, 555.3, 568, 573; 324/220, 754, 72.5, 627, 644, 662, 158.1; 356/601–612, 241.1

(56) References Cited

U.S. PATENT DOCUMENTS

| | | | | |
|---|---|---|---|---|
| 2,203,984 A | * | 6/1940 | Deters | 33/550 |
| 4,729,174 A | * | 3/1988 | Caron et al. | 33/228 |
| 4,916,824 A | * | 4/1990 | Shimazutsu et al. | 33/533 |
| 6,298,571 B1 | * | 10/2001 | Dall'Aglio et al. | 33/555.1 |

FOREIGN PATENT DOCUMENTS

GB        2056069 A  *  3/1981   ............ G01B/5/24

OTHER PUBLICATIONS

Green, Ed, 25th Ed. Machinery's Handbook, Industrial Press Inc., 1996, pp. 689–693.

* cited by examiner

*Primary Examiner*—Diego Gutierrez
*Assistant Examiner*—Eric H Linn, Jr.
(74) *Attorney, Agent, or Firm*—Malcolm D. Reid; Robert W. Gutenkauf; Cecilia M. Jaisle

(57) ABSTRACT

A tapered part measuring apparatus and method measures male and female tapered or conical parts. The apparatus and method use non-contact linear measurement technology for accurate and repeatable measurements, particularly of tapered parts with large deviations from their desired measurements. The tapered part suspends in non-contact position to the non-contact linear measurement probe on a true vertical axis to accurately assume the same position on replicate measurements.

15 Claims, 6 Drawing Sheets

APPARATUS AND METHOD TO MEASURE TAPERED OR CONICAL PARTS

FIELD OF THE INVENTION

This invention is an improvement in measuring male and female tapered or conical parts. More particularly, this invention is an apparatus and method for measuring such parts that use non-contact linear measurement technology and that can accurately and repeatably measure tapered or conical parts. The inventive apparatus and method are particularly suited to measuring tapered parts that exhibit large deviations from their desired measurements.

BACKGROUND OF THE INVENTION

The 25th Edition of Machinery's Handbook, Industrial Press Inc., New York, 1996, at pp. 689–693, describes measurement of a tapered or conical part. This handbook describes suitable methods for determining measurements of an exteriorly tapered or conical (male) part and for determining measurements of an interiorly tapered or conical (female) part.

A method for determining the measurement of an exteriorly tapered or conical (male) part is as follows. The axis of a vee-block aligns with the sides of a sine-bar, as in FIGS. 1A–C. The male tapered part 10 to be measured positions in the vee-block 12. The male tapered part 10 aligns perpendicularly to the transverse axis of the sine-bar 14. The sine-bar 14 offsets to the proper height to define a flat plane for the top surface 16 of the male tapered part 10, as shown in FIG. 1C. The sine-bar 14 is set to the angle B=(C+A/2), where A/2 is one-half the included exterior angle of the male tapered part 10, as shown in FIG. 1C. Where D is the included angle of the precision vee-block 12, as shown in FIG. 1B, the angle C, shown in FIG. 1C, is calculated from the formula:

$$\operatorname{Sin} C = \frac{\operatorname{Sin} A/2}{\operatorname{Sin} D/2}$$

This determines the total included angle of the male tapered part 10. If all points along the top surface 16 of the tapered part 10 are co-linear and co-planar, as in FIG. 1C, this confirms the planarity (absence of concavity/convexity) of the exterior surface of the male tapered part 10 along that line. By continuing such replicate measurements along the surface of the male tapered part 10, the concavity/convexity for the entire part 10 is determined.

Machinery's Handbook also describes measurement of an interiorly tapered or conical (female) part 18, with reference to FIG. 2. The method uses individual balls B, B1 of two or more different sizes that each has a given fit diameter within the interior of the female tapered part 18. The principle of the ball method of taper measurement is described with reference to the gauge 20 in FIG. 2. When two balls B, B1 of unequal diameters are either in contact or a known distance apart, lines tangent to both their circumferences will represent an angle or taper. The degree of the angle or taper depends upon the diameters of the two balls B, B1 and the distance C between their centers. The gauge 24 in FIG. 2 consists of two adjustable straight edges A, A1, in contact with balls B, B1. The angle α, or the taper between the straight edges A, A1, depends upon the diameters of the balls B, B1 and the center distance C between the balls. By measuring these three dimensions accurately, the gauge 20 can be set to a given angle.

The first ball B inserts into the taper defined between A and A1 and the height of B from the base of the taper is measured. Then a second, larger ball B1 inserts into the taper and the difference in heights between B and B1 from the base of the taper is measured. The difference between the larger and smaller diameters of the female tapered part 18 (i.e., diameters of the balls B and B1) and the length of the longitudinal axis of the female tapered part 18 (i.e., center distance C) define the planarity (absence of concavity/convexity) of the interior surface of the female tapered part 18.

All state-of-the-art-measuring devices utilize some variation on the principles of measurement of the interior (female) or exterior (male) conical or tapered part as described above. For example, current commercially available gauges using air jet nozzles employ the following method for measuring exterior (male) tapers.

A typical conventional gauge uses a funnel-shaped receptacle, known as a "pot." The interior pot surface has orifices for small air jet nozzles that direct airflow at the interior of the pot and at an exteriorly tapered part supported within the pot. The air jet nozzles arrange in horizontally aligned pairs, and the nozzles of each pair position 180° apart from each other. The gauge generally has three pairs of air jet nozzles arranged at three different horizontal levels, respectively, within the pot. A first set of nozzles positions to measure a larger diameter of the taper. A second set of nozzles positions at about the middle of the taper height to measure an intermediate diameter of the taper. A third set of nozzles positions to measure a smaller diameter of the taper.

The interior taper of the pot provides contact support for the male tapered part to be measured. The air pressure exerted by each aligned pair of air jet nozzles within the pot is measured with the exteriorly tapered part in place and with an exteriorly tapered mastering part in place. When the mastering part is in place, a minimal air gap exists between the mastering part and the pot. With the mastering part in place, an initial pressure is measured to calibrate the gauge. The air gap between the mastering part and the pot is determined at each set of air jet nozzles. Then, the mastering part is removed and replaced with a male tapered part to be measured.

There is a difference between the pressure measurement with the male tapered part to be measured in the pot and the pressure measurement with the male tapered mastering part in place. The difference in air pressures determined by each pair of air jet nozzles is used to calculate the difference between the diameter of the mastering part and the diameter of the tapered part horizontal to that pair of air jet nozzles. The air gap between the male tapered part being measured and the pot is determined and compared to the air gap determined between the mastering part and the pot at each set of air jet nozzles. Diameters are thus measured at three different locations along the height of the tapered part. The distance between any two diameters along a vertical axis of the tapered part is known. Lines tangent to the circumferences of both of the circles defined by these diameters will form the angle of the tapered part. This calculation may be made by hand or by the computer measuring the pressure differences.

The top and bottom diameters, measured by the top and bottom air jet nozzles, establish a diameter difference (similar to that determined by the "ball drop" described in Machinery's Handbook). The third diameter, measured by the third set of air jet nozzles, determines the straightness of the taper (its concavity/convexity), by indicating whether the three points are co-linear. Points are co-planar by the construction of the pot.

The diameters are measured with the tapered part resting in contact with the pot in a "gravity seat;" that is, the part rests there under its own weight. The tapered part positions in the pot relative to the air jet nozzles. If the tapered part should fit off-center and over on one side of the pot, one of the air jet nozzles will be plugged and restricted. The restricted air jet nozzle will register an incorrect higher-than-average pressure, while the corresponding horizontally opposite air jet nozzle will register an incorrect lower-than-average pressure. The pair of air jet nozzles operatively connects, so that the corresponding gaps between the tapered part and each air jet nozzle are averaged and the diameter of the tapered part at that point can be measured.

The currently available system of measuring tapered parts is limited, because the air jet nozzles must position close to the surface of the tapered part (i.e., with only a small gap between the tapered part to be measured and the pot). The tapered part may tend to position off-center, or may tend to deviate from the expected mean size, so that a surface of the tapered part is too far from the air jet nozzle. When this happens, the tapered part is not within the linear measuring range of that air jet nozzle and a correct diameter measurement cannot be obtained. Close positioning of the tapered part to the pot and to the air jet nozzles is required so that the diameters of the tapered part position within the linear measurement range of the jets to obtain reliably repeatable measurements. If the gap between the tapered part and the pot becomes too large, the pressure drop between the air pressure measurement within the empty pot and the air pressure measurement with the tapered part inserted will not be linear. In this case, exact measurement can only be obtained if the tapered part is very close to its required finished dimensions. Measurement of tapered parts that deviate greatly from the required finished dimensions will be inaccurate and will not give reliably repeatable measurements.

If the tapered part seats within the pot with the longitudinal axis of the tapered part offset from true vertical alignment, the air jet nozzles will be unable to accurately measure a true diameter of the part. The air jet nozzles will measure some diameter of an elliptical portion of the tapered part and incorrectly report it as a diameter of a circle.

BRIEF DESCRIPTION OF THE INVENTION

An apparatus for measuring a freely suspending tapered part according to this invention has a plurality of non-contact linear measuring probes positioned to determine critical measurements on the tapered part. The tapered part, which is symmetrical about its central axis, suspends in a position normal to its axis. The tapered part may be symmetrical about its central axis in two dimensions, such as a wedge (male taper) or a trough (female taper), or in three dimensions, such as a cone (male taper) or a funnel (female taper).

A first pair of non-contact linear measuring probes aligns in non-contact position to a larger portion of the part. The part suspends so that the larger portion is within the linear measuring range of the first pair of probes. The first pair of probes measures a diameter of the part at the larger portion. A second pair of non-contact linear measuring probes aligns in non- contact position to a smaller portion of the part. The part suspends so that the smaller portion is within non-contact linear measuring range of the second pair of probes. The second pair of probes measures a diameter of the part at the smaller portion. By measuring the diameters of the part at the larger and the smaller portions and the known vertical distance between the diameters, the included angle of the part is calculated.

A fifth non-contact linear measuring probe may position in vertical alignment with one each of the first and the second pairs of probes. This fifth probe will align in a non-contact linear measuring position to the part. The three points, that is, the first point (of one of the first pair of probes), the second point (of one of the second pair of probes), and the fifth point (vertically aligned with the first and second points), align vertically with the vertical axis of the part. By measuring the straightness of the line defined by these three points, the concavity/convexity of the part surface is also determined.

The probes may be based on any type of non-contact measuring technology capable of non-contact linear measurement. Suitable examples include a capacitance probe, a laser micrometer, a light or sound based non-contact linear measuring device, or an LVDT (linear voltage displacement transducer) with a powered probe that activates once the taper is positioned. Non-contact linear measurement systems are preferable to contact linear measurement systems, because contact linear measurement will show hysteresis in the measurement.

The tapered part can be a male tapered part, in which case the probes are retained within a female tapered support. The male part is freely suspending. For example, the male part may suspend from the support, for example, by a rim horizontally extending from an upper surface of the male tapered part. The male tapered part can be a cone or a wedge. The tapered part can be a female tapered part, in which case the probes are retained within a male tapered support and the female part is freely suspending. The female tapered part can be a funnel or a trough.

This invention also comprises a method of measuring a tapered part. A tapered part to be measured suspends in a position normal to a central axis of the part. A first pair of non-contact linear measuring probes aligns in non-contact position to a larger portion of the part and at a larger portion of the support. The part is positioned with the larger portion within non-contact linear measuring range of the first pair of probes, so that the first pair of probes can measure the diameter of the part at the larger portion.

A second pair of non-contact linear measuring probes aligns in non-contact position to a smaller portion of the part and at a smaller portion of the support. The part is positioned with the smaller portion within non-contact linear measuring range of the second pair of probes, so that the second pair of probes can measure the diameter of the part at the smaller portion.

The first pair of probes measures the larger diameter of the empty support. The second pair of probes measures the smaller diameter of the empty support. The tapered part freely suspends in a position normal to a central axis of the part and within non-contact linear measuring range of the probes. The first pair of probes measures the gap between the perimeter of the diameter of the larger portion of the part and the perimeter of the aligned larger diameter of the support. The second pair of probes measures the gap between the perimeter of the diameter of the smaller portion of the part and the perimeter of the aligned smaller diameter of the support. By measuring the diameters of the part at the larger and the smaller portions and the vertical distance between the midpoints of the diameters, the included angle of the part is measured.

A fifth non-contact linear measuring probe may further align in a non-contact position to a fifth point on the part vertically different from the larger and smaller portions. The part is positioned with the fifth point within non-contact linear measuring range of the fifth probe, to measure the planarity of the part surface (convexity/concavity) in conjunction with one each of the first and second pairs of probes. The fifth probe vertically aligns with one each of the first and second pairs of probes. A first point on the larger diameter circumference, a second point on the smaller diameter circumference and a fifth point determined by the fifth probe determine a line in vertical alignment with a vertical axis of the part. The planarity of the line determined by the first and second points and the fifth point determines the concavity/convexity of the part.

The probes may be any non-contact linear measuring probes, including a capacitance probe, a laser micrometer, or any other suitable non-contact linear measuring technology. The support may be a funnel, a trough, a cone or a wedge and the part may correspondingly be a cone, a wedge, a funnel or a trough.

DETAILED DESCRIPTION OF THE INVENTION

Figure 1A:
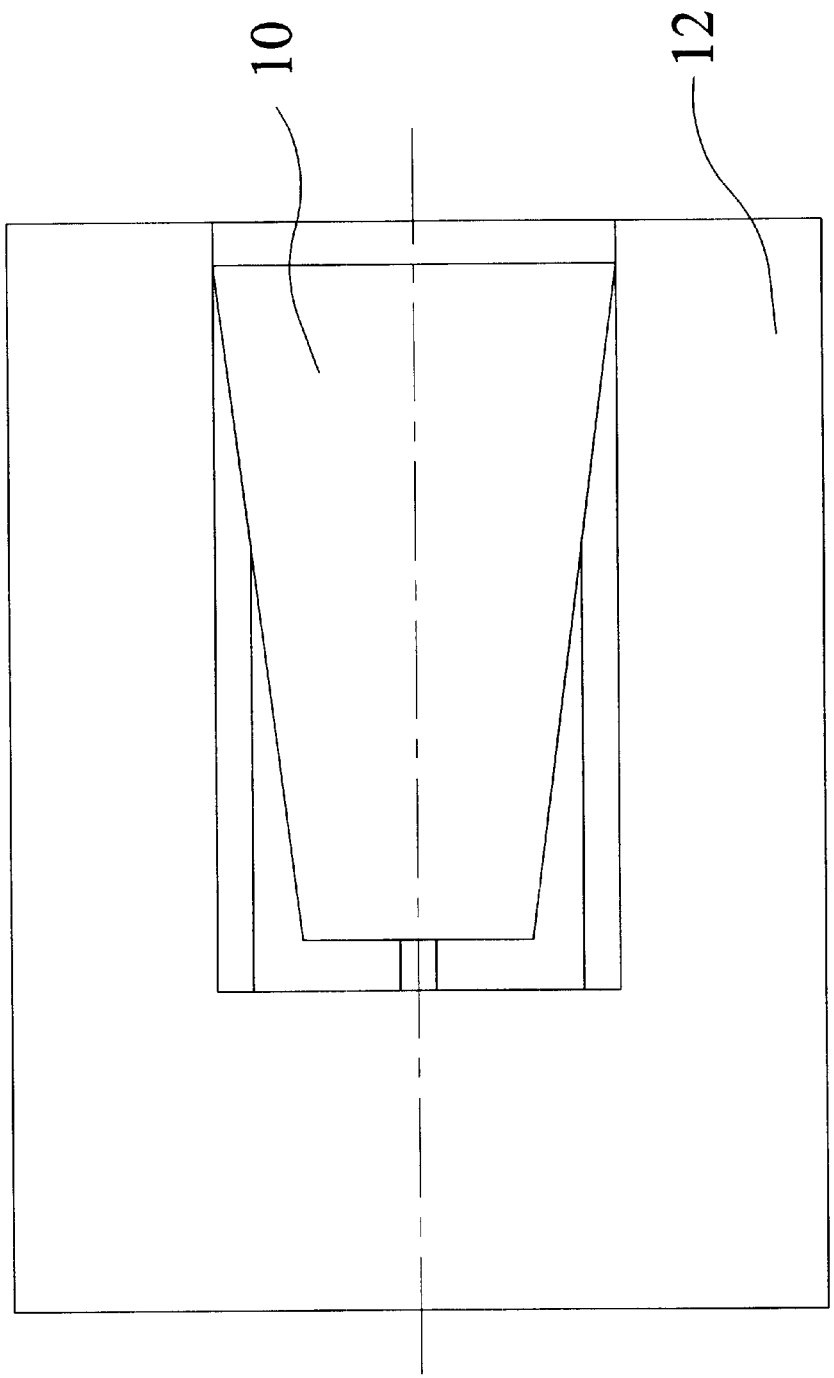
FIGS. 1A, 1B and 1C, from Machinery's Handbook, illustrate the measurement of an exterior taper th a vee-block and a sine-bar.
Figure 1B:
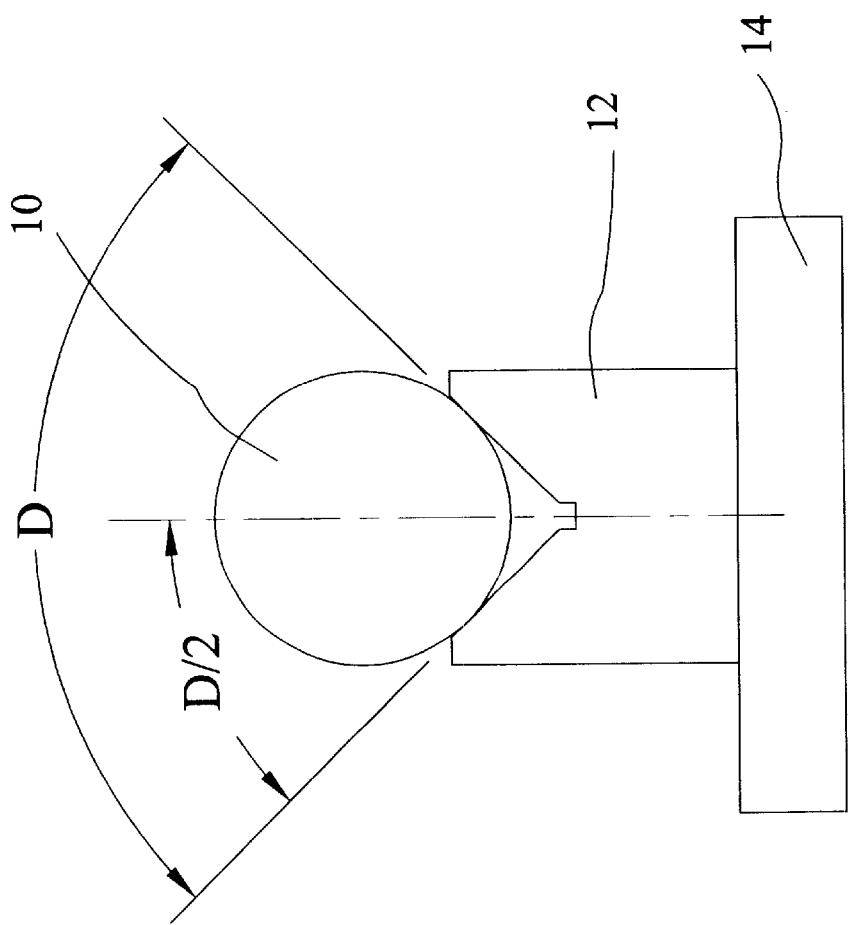
Figure 1C:
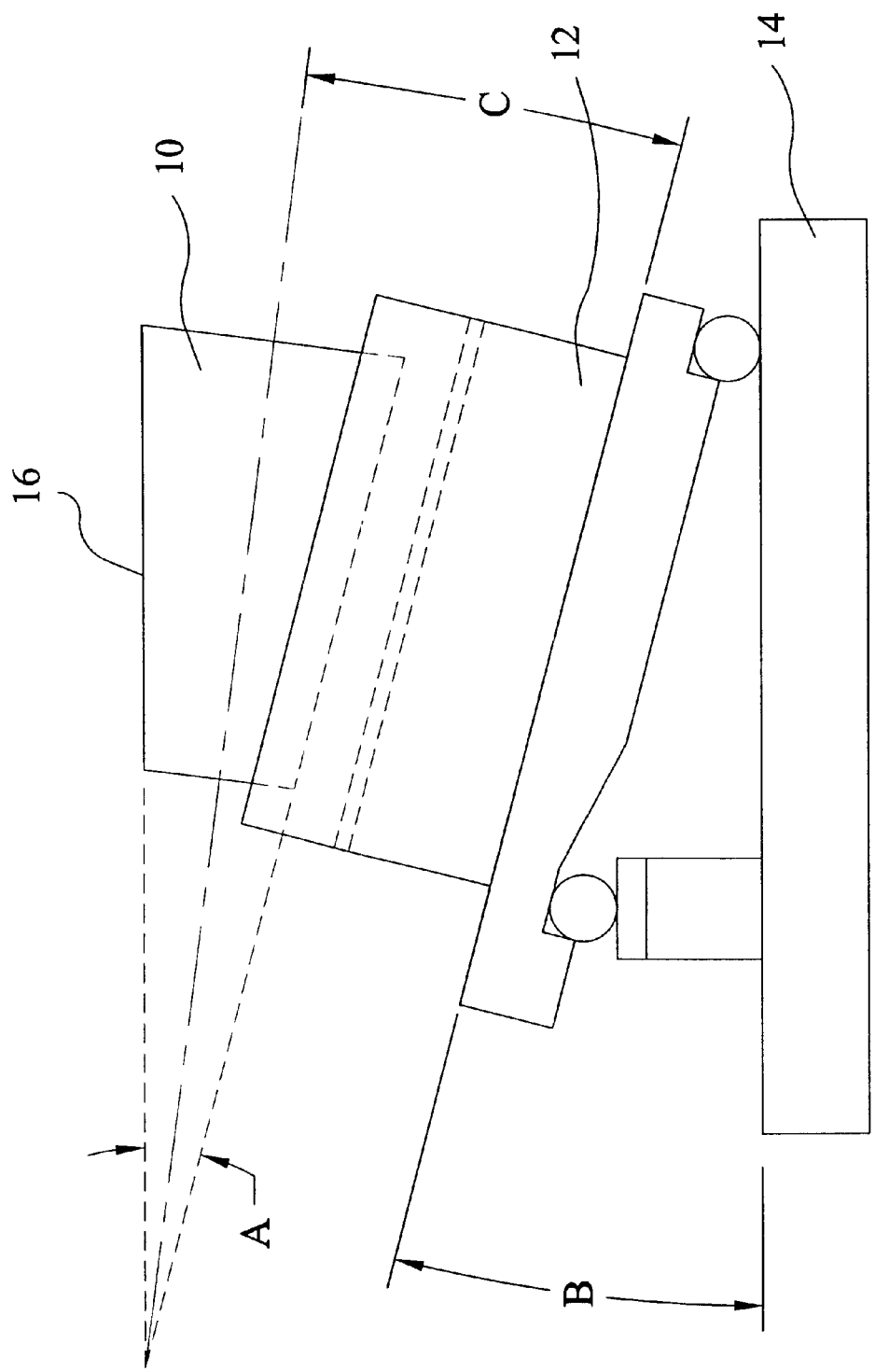
Figure 2:
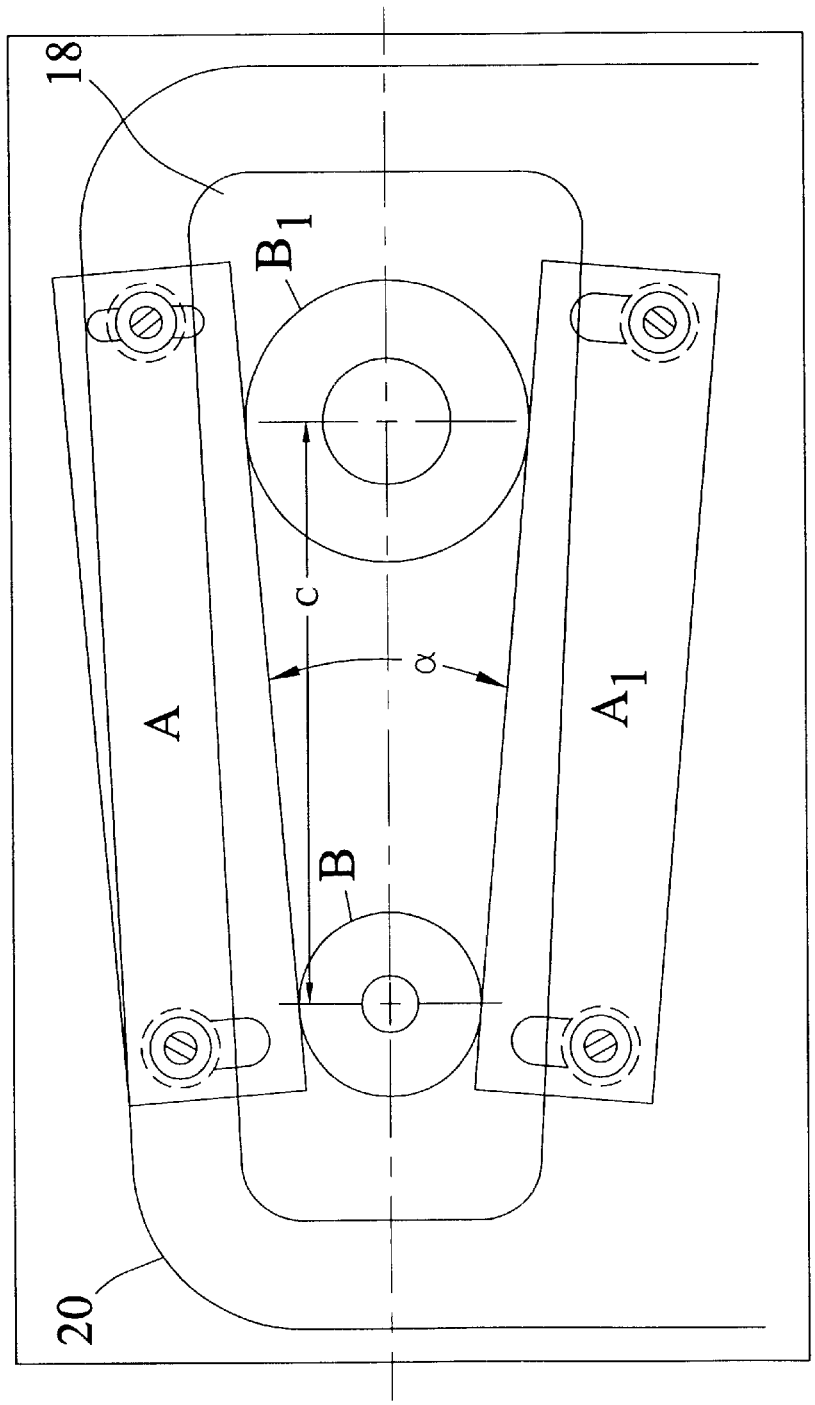
FIG. 2, from Machinery's Handbook, illustrates the measurement of an interior taper ith standardized balls or disks.
Figure 3:
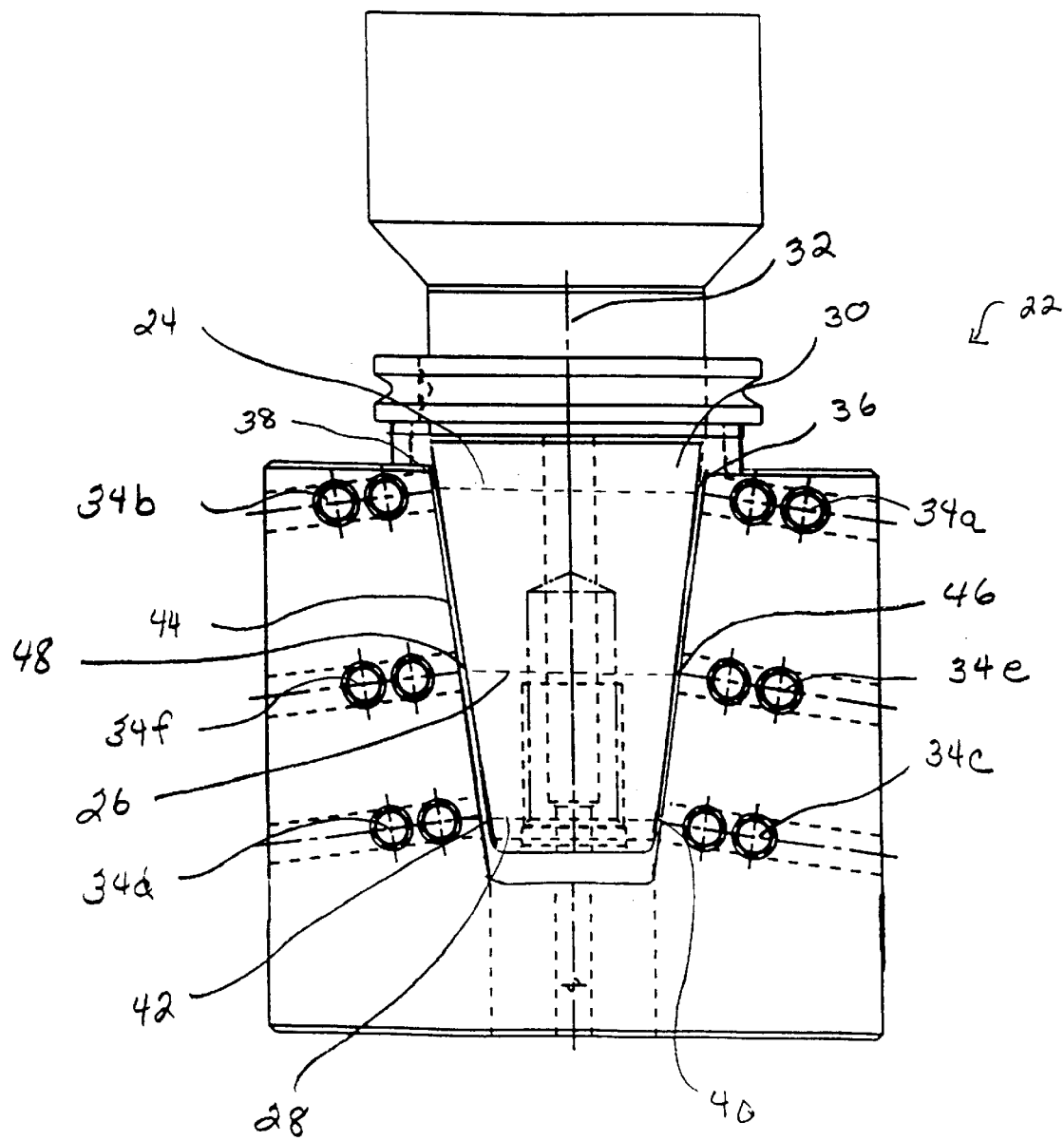
FIG. 3 is side cut-away view of an apparatus of the present invention.
Figure 4:
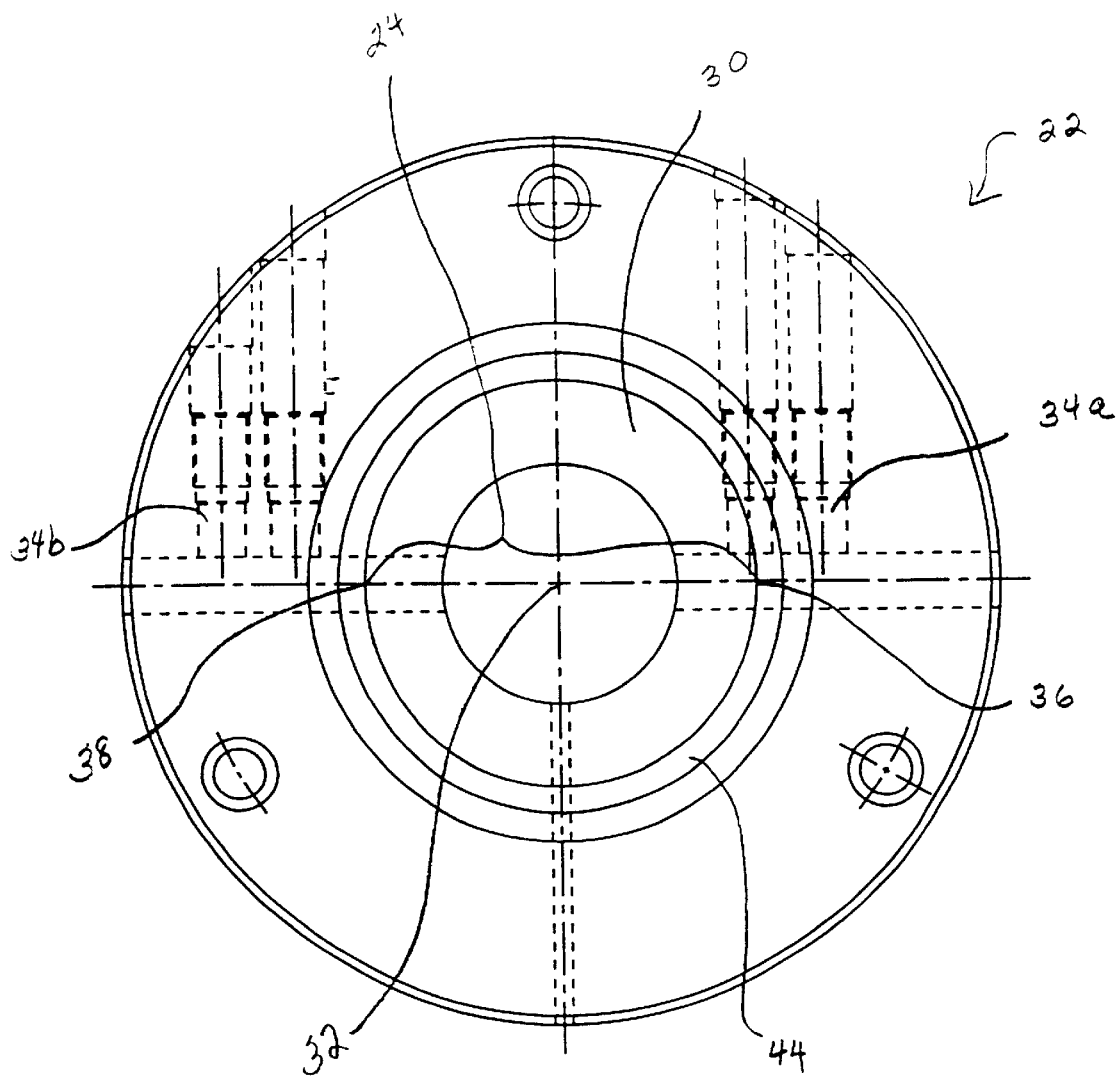
FIG. 4 is a top plan view of an apparatus of the present invention.

The tapered part measuring apparatus 22 of the present invention, as shown in FIGS. 3 and 4, represents an improvement over currently available devices for measuring a tapered part that depend on air jets. The present inventive apparatus 22 very accurately measures various diameters 24, 26, 28 along the vertical height of the tapered part 30. The apparatus 22 is free of the linear range restrictions inherent in the use of air jet probes. The tapered part 30 freely suspends in a vertical position normal to the central axis 32 of the part 30. That is, the tapered part 30 is in non-contact position with the inventive measuring apparatus 22. The part 30 to be measured does not have to be precisely positioned, as long as it is within the measuring range of the non-contact measuring probe or probes 34. The measurement can be accomplished more quickly than previously available measurement systems and/or automated for high production rates. Because the tapered part 30 is always within a non-contact linear measuring portion of the operating range of the probe 34, measurements are obtained which are of much more consistent and repeatable values than can be obtained with air jets.

The inventive apparatus shown in FIGS. 3 and 4 is shown with the probes positioned to measure the exterior surface of a male tapered part. An apparatus of this invention to measure the interior surface of a female tapered part assembles with the probes positioned within the surface of a male cone. The female tapered part suspends freely within the measuring range of the non-contact probe or probes.

A variety of non-contact linear measuring probes 34 may be used in an apparatus of this invention. Suitable probes 34 include a capacitance probe or a laser micrometer. One embodiment of our invention uses capacitance probes that have an operating range of ±0.010 inches. Capacitance probes allow non-contact linear measurement of tapered parts that differ substantially from a master. Capacitance probes also allow non-contact linear measurement that does not apply any side or horizontal force into the measuring device. Suitable capacitance probes are non-contact diameter gauges available from Lion Precision, a division of AQT, Inc., 563 Shoreview Park Rd., St. Paul, Minn. 55126-7014. Laser micrometers are suitable for use in the present tapered part measurement apparatus. Other types of non-contact linear measuring probes with the capability to provide accurate and repeatable non-contact linear measurements are suitable for use in the apparatus of this invention. Such other probes include light or sound based non-contact linear measuring devices or an LVDT (linear voltage displacement transducer) with a powered probe that activates once the taper is positioned.

A taper measurement apparatus of this invention provides improved gauge reproducibility and repeatability over other currently available taper measuring systems. The taper measurement apparatus, such as the apparatus 22, measures the gap 44 from a known surface (the surface of the apparatus 22) to a new surface (the surface of the tapered part 30 to be measured). Taper masters are typically produced within about 0.000010–0.000020 in an ATD (Address Transition Detection) tolerance relative to the ISO 1947 standards.

The tapered part measurement apparatus 22 uses probes to accurately determine measurements in at least four locations 36, 38, 40, 42 on the tapered part 30 to be measured. The locations 36, 38 correspond to the diameter 24 measured by probes 34a, 34b and the locations 40, 42 correspond to the diameter 28 measured by probes 34c, 34d. Typically, this apparatus 22 can determine about four to six measurements, and can be adapted to determine up to about nine to twelve measurements, or any convenient number of data gathering measurements. When a third diameter 26 is to be determined, the tapered part measurement apparatus 22 uses probes 34e, 34f to accurately determine measurements at locations 46, 48. The number of non-contact linear measurement probes determines the number of data measurements. The present apparatus 22 can compare a linear measurement on a taper master to a linear measurement at the same exact point on a tapered part 30 to be measured. The linear measurement accuracy of the present apparatus 22 is less than about 0.000010 inch, and preferably about 0.000001 inch.

According to one embodiment of the present invention, the measurement inputs from the top two probes 34a, 34b and the measurement inputs from the bottom two probes 34c, 34d are added. The difference between the top 24 and bottom diameters 28 is determined. The angle measurement of the included taper angle is determined. Tolerances are established and computer analysis provides any required type of reporting method. The present inventive apparatus 22 provides an increased measuring range and increased ease of use. Because of the increased measuring range, the tapered part 30 suspends vertically in a non-contact position in relation to the measuring probes 34. The obtained readings are unaffected by a contact fit of the tapered part 30 within the measuring apparatus 22. The inventive apparatus 22 can measure a taper 30 with a poor fit and obtain a reading that repeats very well in multiple gauge setups. In older systems, bad tapers would provide inconsistent results. The present apparatus 22 provides repeatable measurements, so that replicate measurements differ by as little as about 0.000010 inch. A computerized system tabulates the measurement data.

Some conventional taper measuring devices, such as those using air jet gauges, have an indicator, such as a travel type indicator, anticipating a linear push from the tapered part to be measured. With this type of indicator, when the tapered part seats into the spindle, the part introduces a small side or horizontal force to the indicator. This side force eventually affects the performance and accuracy of the indicator by wearing out the indicator bearings. Such a conventional tapered part measurement system cannot use an LVDT probe. In a conventional tapered part measurement system, the part to be measured contacts the measuring apparatus. The side or horizontal force between the part and the apparatus would affect the accuracy and repeatability of the measurements if an LVDT were to be used. The side force introduces hysteresis into the measurement. The taper measurement apparatus of the present invention makes no contact with the tapered part and provides accurate, repeatable non-contact linear measurement of diameters of the part and of the planarity (concavity/convexity) of the part surface.

The problems encountered with other existing taper measuring apparatus, such as those that use air jet gauges, are primarily related to the fact that the tapered part makes a contact or "jam" fit with the measuring apparatus. In a jam fit, the taper makes a friction fit into the measuring apparatus or "pot" and has no freedom of movement therein. The tapered part to be measured will seat in the pot to the appropriate dimension up to a point and then will stick because the tapers of the tool and the pot meet so closely. The standard taper is able to fit in the pot to about within a few tenths of its actual location but will then typically be stuck. On a subsequent measurement, the standard taper may not seat at the same location, and thus will be unable to measure the exact same diameter that was previously measured. This inability to obtain replicate positioning on repeated measurements degrades from the accuracy of the measuring apparatus.

In the apparatus 22 of this invention, the tapered part 30 suspends or floats vertically in relationship to the inventive apparatus 22. The part 30 will align to the same location relative to the measuring apparatus 30 on replicate positionings, so that repeated measurements are taken at the exact same vertical level on the part. With a contact or jam fit apparatus, the central axis of the tapered part may misalign from a true vertical position. In this case, the measurement is not the diameter of a circle, but some diameter of an ellipse, which further affects the accuracy of measurement of the tapered part. Since measurements with very small accuracy tolerances are required, such distortions have a negative effect on measuring accuracy, reproducibility and repeatability.

The tapered part measuring apparatus of this invention has the following advantages. The tapered part suspends in non-contact on a true vertical axis, and accurately assumes the same position on replicate measurements. The dimension of the tapered part being measured is easily moved, thus making the measurement easier to attain, especially in an automated set-up.

That which is claimed is:

1. An apparatus for measuring a tapered part freely suspended in a position normal to its axis, said apparatus comprising:
    a first pair of non-contact linear measuring probes aligned in non-contact position to a larger portion of the freely suspended part, and positioned within the probes' non-contact linear measuring range to measure a diameter of the part at the larger portion; and
    a second pair of non-contact linear measuring probes aligned in non-contact position to a smaller portion of the part, and positioned within the probes' non-contact linear measuring range to measure a diameter of the part at the smaller portion.

2. An apparatus according to claim 1, and further comprising a fifth linear non-contact measuring probe aligned in non-contact position to a point on the part vertically different than points measured by the first and second pair of probes, and positioned within the fifth probe's non-contact linear measuring range to measure concavity/convexity of the part surface in conjunction with a vertically aligned one each of the first and second pairs of probes.

3. An apparatus according to claim 1, wherein the probes are selected from a capacitance probe, a laser micrometer, a light based non-contact linear measuring device, a sound based non-contact linear measuring device, and an LVDT with powered probe that activates once the taper is positioned.

4. An apparatus according to claim 1, wherein the tapered part is a freely suspending male tapered part and the probes are retained within a female tapered support.

5. An apparatus according to claim 4, wherein the male tapered part is a cone.

6. An apparatus according to claim 4, wherein the male tapered part is a wedge.

7. A apparatus according to claim 1, wherein the tapered part is a freely suspending female tapered part and the probes are retained within a male tapered support.

8. An apparatus according to claim 7, wherein the female tapered part is a funnel.

9. An apparatus according to claim 7, wherein the female tapered part is a trough.

10. A method of measuring a tapered part comprising:
    aligning a first pair of non-contact linear measuring probes in non-contact position to a larger portion of a freely suspended tapered part, so that the part is positioned with the larger portion within non-contact linear measuring range of the first pair of probes, to measure a diameter of the part at the larger portion;
    aligning a second pair of non-contact linear measuring probes in non-contact position to a smaller portion of the freely suspended tapered part, so that the part is positioned with the smaller portion within non-contact linear measuring range of the second pair of probes, to measure a diameter of the part at the smaller portion;
    measuring a first distance between the first pair of probes;
    measuring a second distance between the second pair of probes;
    freely suspending the tapered part in a position normal to a vertical central axis of the part within non-contact measuring range of the probes;
    measuring a first set of gaps between ends of a larger diameter of the part and ends of the aligned first distance, respectively, with the first pair of probes; and
    measuring a second set of gaps between ends of a smaller diameter of the part and ends of the aligned second distance, respectively, with the second pair of probes.

11. A method according to claim 10 wherein:
    the first pair of probes are positioned at a larger portion of a support;
    the second pair of probes are positioned at a smaller portion of the support;
    the first distance is a larger diameter of the empty support;
    the second distance is a smaller diameter of the empty support;
    the tapered part is freely suspending in the support in a position normal to a vertical central axis of the part within non-contact measuring range of the probes;

measuring gaps between ends of a larger diameter of the part and ends of the aligned first distance, respectively, comprises measuring gaps between ends of a larger diameter of the part and ends of the aligned larger diameter of the support; and measuring a second set of gaps between ends of a smaller diameter of the part and ends of the aligned second distance, respectively,. comprises measuring gaps between ends of a smaller diameter of the part and ends of the aligned smaller diameter of the support.

12. A method according to claim 10, and further comprising:

aligning a fifth non-contact linear measuring probe in a non-contact position to a point on the part horizontally unaligned with either the first or second pairs of probes, and within the fifth probe's non-contact linear measuring range;

so that the fifth probe is vertically aligned with one each of the first and second pairs of probes; and establishing a line on the part with the first and second points and a fifth point on the part vertically aligned with the first and second points, the fifth point determined by the fifth probe; and determining concavity/convexity of the part by planarity/nonplanarity of a line having the first, second and fifth points.

13. A method according to claim 10, wherein the probes are selected from a capacitance probe, a laser micrometer, a light based non-contact linear measuring device, a sound based non-contact linear measuring device, and an LVDT with powered probe that activates once the taper is positioned.

14. A method according to claim 10, wherein the part is a male taper.

15. A method according to claim 10, wherein the part is a female taper.

* * * * *